(No Model.)
L. B. WALKER.
PLANTER.
No. 348,801. Patented Sept. 7, 1886.
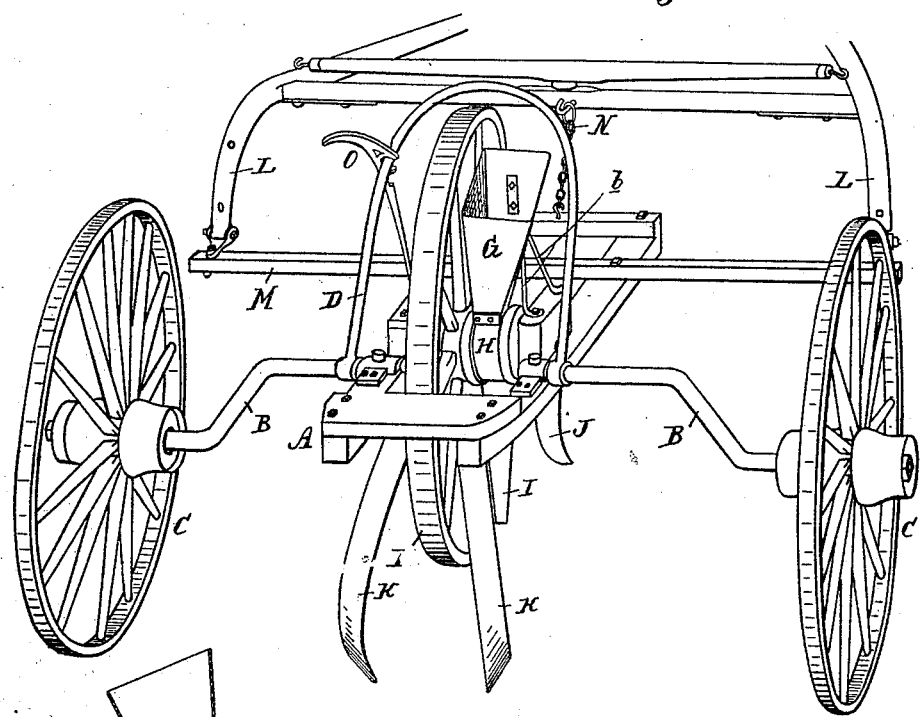
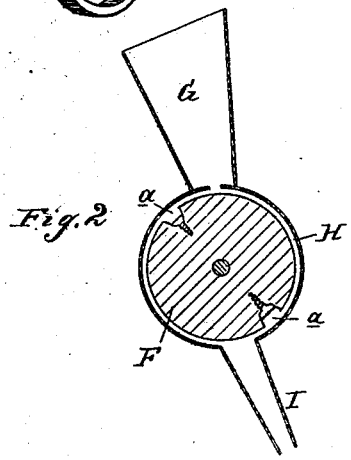
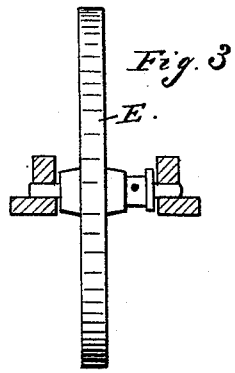
Attest:
John Schuman.
Chas. Thurman.
Inventor:
Leverett B. Walker.
by his Atty
Thos. S. Sprague

UNITED STATES PATENT OFFICE.

LEVERETT BARKER WALKER, OF ST. JOHNS, MICHIGAN.

PLANTER.

SPECIFICATION forming part of Letters Patent No. 348,801, dated September 7, 1886.

Application filed July 1, 1886. Serial No. 206,784. (No model.)

*To all whom it may concern:*

Be it known that I, LEVERETT BARKER WALKER, of St. Johns, in the county of Clinton and State of Michigan, have invented new and useful Improvements in Planters; and I do hereby declare that the following is a full, clear, and exact description thereof, reference being had to the accompanying drawings, which form a part of this specification.

This invention relates to certain new and useful improvements in corn-planters; and the invention consists in the construction and operation of the dropping mechanism, and in the construction, arrangement, and combination of the various parts, all as more fully hereinafter set forth.

Figure 1 is a perspective view of my improved device from the rear. Fig. 2 is a vertical central longitudinal section through the feed mechanism. Fig. 3 is a cross section on the axis of the feed-wheel.

In the accompanying drawings, which form a part of this specification, A represents a suitable frame-work, in each side bar of which the inner ends of the crank-axles B are properly journaled, the outer ends carrying the traction-wheels C.

D is a yoke, the ends of which are rigidly secured to the axles B in such manner that said axles may be turned so as to raise or lower the frame A.

E is a traction-wheel, properly journaled in the frame A about midway between the two wheels C. Upon the shaft of this wheel E is secured a dropper or feed-cylinder, F, in the periphery of which is formed one or more pockets, *a*, to receive the corn or other seed to be planted, delivered thereto from the hopper G, which is mounted upon the frame A, with its discharge immediately over the feed-cylinder, and is secured in place by the brace-rods *b*.

H is a guard or shield around the feed-cylinder F to retain the seed within the pockets of said cylinder until said pocket or pockets come coincident with the mouth of the delivery-spout I. At the front end of the frame, in direct line with the spout I, is secured a cultivator-tooth, J, for cutting the furrow into which the seed is delivered by the spout, and at the rear of the frame are secured the covering-teeth K.

L are the shafts, which are secured to the draft-bar M in the usual manner, said bar M being rigidly secured to the frame A.

N is a chain connecting the cross-bar of the shafts with the front end of the frame, and is designed for adjusting the shafts to the size of the horse, and yet preserve the lead of the machine.

In practice, the parts being constructed and arranged substantially as described and with the bail D engaged with the lock-bar O, the machine is ready to be taken to the field or from one field to another.

Being ready to operate, the grain to be planted is put into the hopper and the bail D is released, allowing the axles B to turn in their bearings, and thereby lower the frame till the central wheel comes in contact with the ground. As the machine is drawn forward, the front cultivator forms a furrow, into which the seed is delivered from the spout, such seed being carried to the spout by the rotation of the feed-cylinder. Having arrived at the end of the field, the machine is turned around to the right or left, as the case may be, one wheel following its own track, having thereby a very convenient method of "check-rowing."

It is obvious that one or more feed-cylinders for planting one or more rows may be used, or that the device may be adapted for garden-drills, without departing from the spirit of my invention.

The wheel E has a circumference of three feet eight inches, or a multiple thereof, and this wheel measures the width of row at right angles to the direct motion of the machine.

What I claim as my invention is—

1. In a planter, the combination of a frame mounted upon a crank-axle carrying traction-wheels with a centrally-situated wheel within the frame and operating a feeding-cylinder, substantially as set forth.

2. In combination, the frame A, axles B, wheels C, bail D, central wheel, E, and feed-cylinder F with the hopper G and spout I, substantially as and for the purposes described.

3. In combination, the frame A, axles B, wheels C, bail D, central wheel, E, and feed-cylinder F with the hopper G, spout I, and cultivator-teeth J and K, constructed, arranged, and operating substantially in the manner and for the purposes set forth.

LEVERETT BARKER WALKER.

Witnesses:
R. C. DEXTER,
P. E. WALSWORTH.